US011173917B2

(12) United States Patent
Zheng et al.

(10) Patent No.: US 11,173,917 B2
(45) Date of Patent: Nov. 16, 2021

(54) CONTROL APPARATUS FOR FOUR-WHEEL DRIVE VEHICLE

(71) Applicant: JTEKT CORPORATION, Osaka (JP)

(72) Inventors: Hui Zheng, Takahama (JP); Wataru Hirata, Ichinomiya (JP); Tetsuya Yamazaki, Tokai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/071,469

(22) Filed: Oct. 15, 2020

(65) Prior Publication Data

US 2021/0122370 A1 Apr. 29, 2021

(30) Foreign Application Priority Data

Oct. 24, 2019 (JP) .............................. JP2019-193466

(51) Int. Cl.
*B60W 30/188* (2012.01)
*B60W 40/105* (2012.01)
*B60W 10/119* (2012.01)
*B60W 40/107* (2012.01)

(52) U.S. Cl.
CPC ........ *B60W 30/188* (2013.01); *B60W 10/119* (2013.01); *B60W 40/105* (2013.01); *B60W 40/107* (2013.01); *B60W 2520/105* (2013.01); *B60W 2520/28* (2013.01)

(58) Field of Classification Search
CPC ............. B60W 30/188; B60W 40/105; B60W 10/119; B60W 40/107; B60W 2520/105; B60W 2520/28
See application file for complete search history.

(56) References Cited

U.S. PATENT DOCUMENTS

| 2017/0028983 | A1* | 2/2017 | Fukudome | .............. B60L 50/51 |
| 2019/0084418 | A1 | 3/2019 | Watanabe | |
| 2019/0128917 | A1* | 5/2019 | Watanabe | ............... G01P 3/481 |

FOREIGN PATENT DOCUMENTS

| JP | 2002-127881 A | 5/2002 | |
| JP | 2019-55682 A | 4/2019 | |
| WO | WO-2012140763 A1 * | 10/2012 | ............ B60W 50/02 |

* cited by examiner

*Primary Examiner* — Justin Holmes
(74) *Attorney, Agent, or Firm* — Oblon, McClelland, Maier & Neustadt, L.L.P.

(57) ABSTRACT

A control apparatus configured to control a four-wheel drive vehicle configured to drive right and left front wheels and right and left rear wheels includes an electronic control unit. The electronic control unit calculates a vehicle body speed based on rotation speeds of the wheels and a cumulative value of accelerations in a longitudinal direction of the vehicle. The accelerations are detected by an acceleration sensor. The electronic control unit calculates the vehicle body speed based on the cumulative value of the accelerations. The electronic control unit calculates a correction value based on a lowest rotation speed among the rotation speeds of the wheels under a predetermined condition. The electronic control unit performs correction by using the correction value to make the vehicle body speed closer to a vehicle body speed conversion value of the lowest rotation speed.

6 Claims, 3 Drawing Sheets

CONTROL APPARATUS FOR FOUR-WHEEL DRIVE VEHICLE

CROSS-REFERENCE TO RELATED APPLICATION

This application claims priority to Japanese Patent Application No. 2019-193466 filed on Oct. 24, 2019, incorporated herein by reference in its entirety.

BACKGROUND

1. Technical Field

The present disclosure relates to a control apparatus configured to control a four-wheel drive vehicle configured to drive right and left front wheels and right and left rear wheels.

2. Description of Related Art

A vehicle body speed of a vehicle (vehicle speed) is determined based on detection values from rotation speed sensors configured to detect rotation speeds of wheels. In a four-wheel drive vehicle, an accurate vehicle body speed cannot be determined based on rotation speeds of four wheels, for example, when all the four wheels slip during acceleration. Therefore, various proposals are made to obtain a highly accurate vehicle body speed even during acceleration or the like.

In Japanese Unexamined Patent Application Publication No. 2002-127881 (JP 2002-127881 A), when an accelerating state of a vehicle is detected, coefficients of road friction are calculated for four wheels, and an optimum coefficient of road friction is selected from among the calculated coefficients of road friction. An upper limit acceleration value (upper limit value of an acceleration at which the vehicle can be accelerated maximally at the optimum coefficient of road friction) is calculated based on the selected coefficient of road friction. Then, a vehicle body speed is calculated by limiting a selected wheel speed based on the calculated upper limit acceleration value. For example, the coefficient of road friction is estimated based on an arithmetic expression using a driving torque of a wheel, inertia of the wheel, a load on the wheel, and an angular acceleration of the wheel.

Japanese Unexamined Patent Application Publication No. 2019-55682 (JP 2019-55682 A) describes a four-wheel drive vehicle including a first coupling apparatus and a second coupling apparatus. The first coupling apparatus transmits a driving force to a left rear wheel. The second coupling apparatus transmits the driving force to a right rear wheel. During acceleration, a coupling torque of one of the first and second coupling apparatuses is set larger than zero, and a coupling torque of the other is set to zero. Then, a vehicle body speed is calculated based on a rotation speed of the right or left rear wheel whose coupling torque is set to zero.

SUMMARY

In JP 2002-127881 A, the coefficients of road friction cannot always be determined accurately unless the wheels slip. Further, the upper limit acceleration value calculated based on any coefficient of road friction may contain a significant deviation. In JP 2019-55682 A, the driving force to be transmitted to the right or left rear wheel needs to be zero during acceleration. Thus, there is a possibility that stable and sufficient acceleration performance cannot be exerted. In the related-art four-wheel drive vehicles, it is difficult to determine a highly accurate vehicle body speed without impairing the acceleration performance particularly during acceleration in which the wheels are likely to slip.

According to the present disclosure, a highly accurate vehicle body speed can be determined without impairing the acceleration performance.

An aspect of the present disclosure relates to a control apparatus configured to control a four-wheel drive vehicle configured to drive right and left front wheels and right and left rear wheels. The control apparatus includes an electronic control unit. The electronic control unit is configured to calculate a vehicle body speed based on rotation speeds of the wheels and a cumulative value of accelerations in a longitudinal direction of the vehicle. The accelerations are detected by an acceleration sensor. The electronic control unit is configured to calculate the vehicle body speed based on the cumulative value of the accelerations. The electronic control unit is configured to calculate a correction value based on a lowest rotation speed among the rotation speeds of the wheels under a predetermined condition. The electronic control unit is configured to perform correction by using the correction value to make the vehicle body speed closer to a vehicle body speed conversion value of the lowest rotation speed.

With the configuration described above, a highly accurate vehicle body speed can be determined without impairing the acceleration performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the present disclosure is described with reference to FIG. 1 to FIG. 3B. The following embodiment is described as a preferred specific example for carrying out the present disclosure. Although various preferred technical matters are partially exemplified in detail, the technical scope of the present disclosure is not limited to the specific modes.

Configuration of Four-Wheel Drive Vehicle

Figure 1:
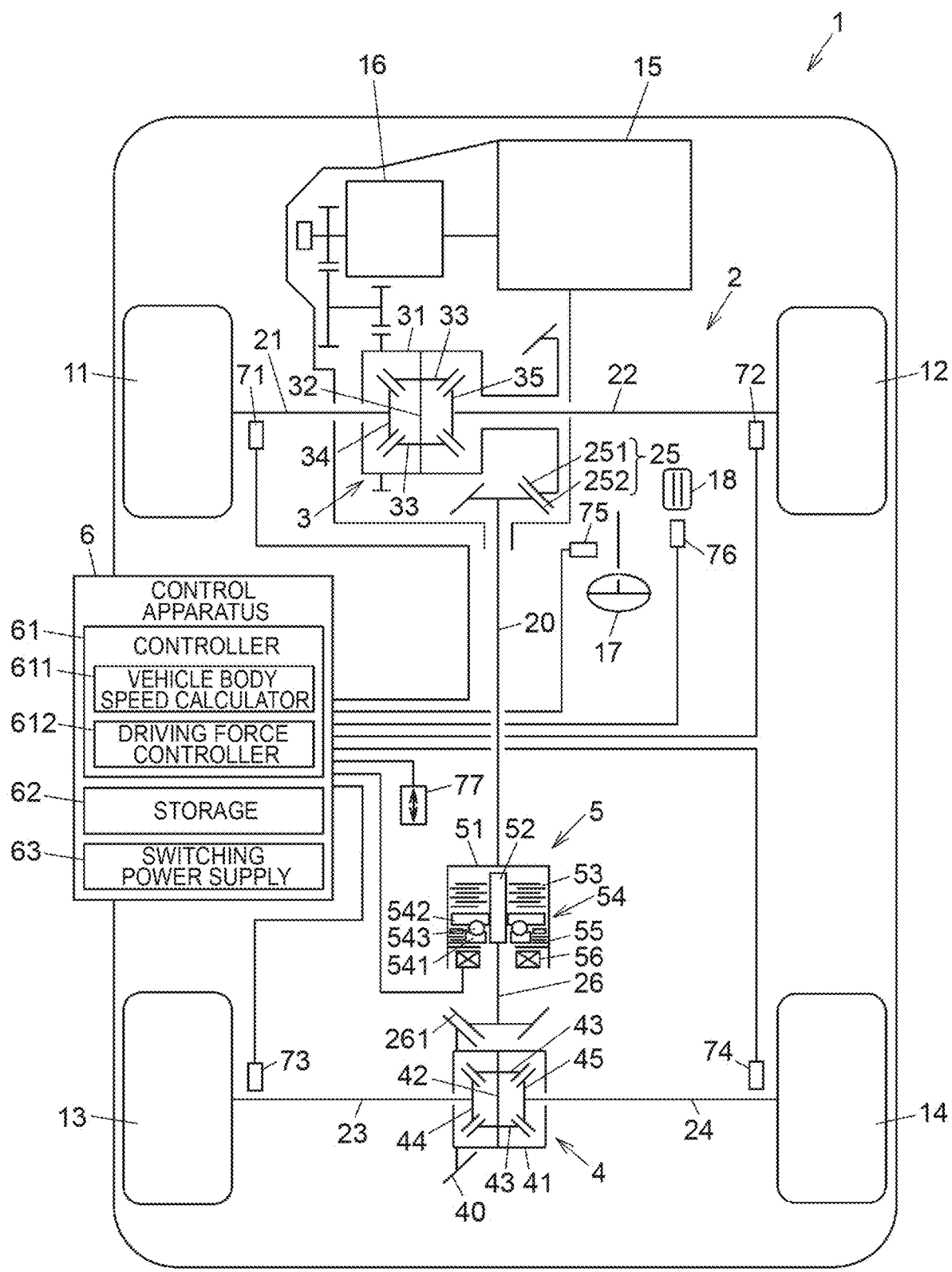
FIG. 1 is a schematic diagram illustrating an example of the configuration of a four-wheel drive vehicle according to an embodiment of the present disclosure.

FIG. 1 is a schematic diagram illustrating an example of the configuration of a four-wheel drive vehicle 1 according to the embodiment of the present disclosure. The four-wheel drive vehicle 1 is configured to drive right and left front wheels and right and left rear wheels. In this embodiment, the four-wheel drive vehicle 1 includes a right front wheel 12 and a left front wheel 11 as main driving wheels to which a driving force is constantly transmitted, and includes a right rear wheel 14 and a left rear wheel 13 as auxiliary driving wheels to which the driving force is transmitted depending on vehicle conditions. The right front wheel 12, the left front wheel 11, the right rear wheel 14, and the left rear wheel 13 are supported by hubs (not illustrated) so as to be rotatable relative to a vehicle body 10.

The four-wheel drive vehicle 1 includes an engine 15, a transmission 16, and a driving force transmission system 2. The engine 15 serves as a drive source. The transmission 16 changes a speed of rotation of an output shaft of the engine 15. The driving force transmission system 2 transmits a driving force of the engine 15 obtained through the speed change in the transmission 16 to the right and left front wheels 12 and 11 and the right and left rear wheels 14 and 13. Examples of the drive source also include an electric motor and a so-called hybrid system including an engine and an electric motor in combination.

The driving force transmission system 2 includes right and left drive shafts 22 and 21 on the front wheel side, right and left drive shafts 24 and 23 on the rear wheel side, a front differential 3, a rear differential 4, a propeller shaft 20, a driving force transmission apparatus 5, and a control apparatus 6. The propeller shaft 20 transmits the driving force in a longitudinal direction of the vehicle. The driving force transmission apparatus 5 transmits the driving force to the right rear wheel 14 and the left rear wheel 13. The control apparatus 6 controls the driving force transmission apparatus 5. In this embodiment, the driving force transmission apparatus 5 is arranged between the propeller shaft 20 and the rear differential 4. The driving force transmission apparatus 5 is configured to adjust the driving force to be transmitted from the propeller shaft 20 to the right rear wheel 14 and the left rear wheel 13.

The front differential 3 includes a front differential case 31, a pinion shaft 32, a pair of pinion gears 33 and 33, and first and second side gears 34 and 35. The pinion shaft 32 rotates together with the front differential case 31. The pinion gears 33 and 33 are rotatably supported by the pinion shaft 32. The first and second side gears 34 and 35 mesh with the pinion gears 33 and 33 with their gear axes set orthogonal to each other. The front differential 3 distributes the driving force to the right front wheel 12 and the left front wheel 11. The right and left drive shafts 22 and 21 on the front wheel side are coupled to the second and first side gears 35 and 34 so as not to be rotatable relative to the second and first side gears 35 and 34, respectively.

The driving force output from the transmission 16 is transmitted to the front differential case 31 of the front differential 3, and is transmitted from the front differential case 31 to the propeller shaft 20 via a gear mechanism 25. Examples of the gear mechanism 25 include a pair of hypoid gears including a ring gear 251 and a pinion gear 252 meshing with each other. The ring gear 251 rotates together with the front differential case 31. The pinion gear 252 is provided atone end of the propeller shaft 20. For example, the other end of the propeller shaft 20 is coupled to the driving force transmission apparatus 5 via a joint spider (not illustrated).

The driving force transmission apparatus 5 includes a bottomed cylindrical housing 51, an inner shaft 52, a multi-disc clutch 53, a cam mechanism 54, an electromagnetic clutch 55, and an electromagnetic coil 56. The driving force is input from the propeller shaft 20 to the housing 51. The inner shaft 52 is supported so as to be coaxially rotatable relative to the housing 51. The multi-disc clutch 53 includes a plurality of clutch plates arranged between the housing 51 and the inner shaft 52. The cam mechanism 54 generates a pressing force for pressing the multi-disc clutch 53. The electromagnetic clutch 55 transmits an actuation force for actuating the cam mechanism 54. The electromagnetic coil 56 is supplied with an exciting current from the control apparatus 6.

When the electromagnetic coil 56 is energized, a magnetic force is generated to engage the electromagnetic clutch 55. With the electromagnetic clutch 55, the rotational force of the housing 51 is partially transmitted to a pilot cam 541 of the cam mechanism 54. The cam mechanism 54 includes the pilot cam 541, a main cam 542, and a plurality of cam balls 543. The pilot cam 541 and the main cam 542 are rotatable relative to each other in a predetermined angle range. The cam balls 543 are rollable between the pilot cam 541 and the main cam 542. The pilot cam 541 and the main cam 542 have cam grooves inclined with respect to their circumferential directions. The cam balls 543 roll along the cam grooves.

The main cam 542 is axially movable but not rotatable relative to the inner shaft 52. When the pilot cam 541 rotates relative to the main cam 542 with the rotational force transmitted by the electromagnetic clutch 55, the cam balls 543 roll along the cam grooves, and the main cam 542 moves away from the pilot cam 541. Then, the multi-disc clutch 53 is pressed, and the clutch plates are brought into frictional contact with each other. Thus, the driving force is transmitted between the housing 51 and the inner shaft 52. The driving force to be transmitted by the multi-disc clutch 53 changes depending on the magnitude of the current supplied to the electromagnetic coil 56.

A pinion gear shaft 26 having a gear portion 261 at one end is coupled to the inner shaft 52 of the driving force transmission apparatus 5 so as not to be rotatable relative to the inner shaft 52. The gear portion 261 of the pinion gear shaft 26 meshes with a ring gear 40 fixed to a rear differential case 41 of the rear differential 4.

The rear differential 4 includes the rear differential case 41, a pinion shaft 42, a pair of pinion gears 43 and 43, and first and second side gears 44 and 45. The pinion shaft 42 rotates together with the rear differential case 41. The pinion gears 43 and 43 are rotatably supported by the pinion shaft 42. The first and second side gears 44 and 45 mesh with the pinion gears 43 and 43 with their gear axes set orthogonal to each other. The rear differential 4 distributes the driving force to the right rear wheel 14 and the left rear wheel 13. The right and left drive shafts 24 and 23 on the rear wheel side are coupled to the second and first side gears 45 and 44 so as not to be rotatable relative to the second and first side gears 45 and 44, respectively.

The control apparatus 6 includes a controller 61, a storage 62, and a switching power supply 63. The control apparatus 6 may include the electronic control unit (ECU). The controller 61 includes a central processing unit (CPU: arithmetic processor). The storage 62 includes a non-volatile memory. The controller 61 functions as a vehicle body speed calculator 611 and a driving force controller 612 such that the CPU executes programs stored in the storage 62. The vehicle body speed calculator 611 calculates a vehicle body speed, which is a movement speed of the vehicle body 10 relative to a road. The driving force controller 612 controls, by using the vehicle body speed, a driving force to be transmitted to the right rear wheel 14 and the left rear wheel 13. The switching power supply 63 includes switching elements such as transistors. The switching power supply 63 switches a voltage of a direct-current power supply such as a battery through pulse width modulation (PWM) control of the controller 61 to supply the voltage to the electromagnetic coil 56 of the driving force transmission apparatus 5.

The controller 61 is configured to acquire detection values from wheel speed sensors 71 to 74 and a detection value from an acceleration sensor 75 via an internal communication network such as a controller area network (CAN). The wheel speed sensors 71 to 74 detect rotation speeds of the right front wheel 12, the left front wheel 11, the right rear wheel 14, and the left rear wheel 13. The acceleration sensor 75 detects an acceleration in the longitudinal direction of the four-wheel drive vehicle 1 (longitudinal G-force).

Examples of the wheel speed sensors 71 to 74 include magnetic wheel speed sensors provided on the hubs. The wheel speed sensor includes a magnetic encoder and a magnetic sensor. The magnetic encoder rotates together with the wheel. The magnetic sensor detects a magnetic force of the magnetic encoder. In the magnetic encoder, a plurality of N poles and a plurality of S poles are alternately arranged along a rotational direction. The magnetic sensor outputs a pulse signal having a period that depends on a wheel speed. For example, a capacitive sensor or a piezoresistive sensor may be used as the acceleration sensor 75 as appropriate.

The controller 61 serving as the vehicle body speed calculator 611 calculates the vehicle body speed based on a cumulative value of the accelerations in the longitudinal direction of the vehicle, which are detected by the acceleration sensor 75, and the rotation speeds of the wheels, which are detected by the wheel speed sensors 71 to 74. The controller 61 serving as the driving force controller 612 controls the driving force transmission apparatus 5 based on slip ratios of the wheels. The slip ratio is determined from "(R·ω−V)/R·ω" during driving or "(V−R·ω)/V" during braking, where V represents the vehicle body speed, R represents a tire radius of the wheel, and a represents the rotation speed of the wheel (angular velocity). By keeping the slip ratios of the wheels within an appropriate range, the driving force is efficiently transmitted to a road while suppressing a slip of the wheels. Thus, the four-wheel drive vehicle 1 can travel stably.

Method for Detecting Vehicle Body Speed

Next, description is given of a method for calculating the vehicle body speed by the vehicle body speed calculator 611. An overview of this calculation method is as follows. A vehicle body speed is calculated based on a cumulative value of accelerations in the longitudinal direction of the vehicle, which are detected by the acceleration sensor 75. A correction value is calculated based on a lowest rotation speed among the rotation speeds of the wheels under a predetermined condition. Correction is performed by using the correction value to make, as a calculation result, the vehicle body speed closer to a vehicle body speed conversion value of the lowest rotation speed. In this embodiment, the predetermined condition is that a difference between the cumulative value of the accelerations in the longitudinal direction of the vehicle and the vehicle body speed conversion value of the lowest rotation speed is smaller than a predetermined value. The vehicle body speed conversion value can be determined by multiplying the rotation speed of the wheel (rad) by the tire radius. In this embodiment, the correction value is calculated based on a difference between a vehicle body speed calculated in a previous control period (previous value of vehicle body speed) and a vehicle body speed conversion value of a lowest rotation speed of a wheel in a current control period. The method for calculating the vehicle body speed is described below in more detail with reference to FIG. 2.

Figure 2:
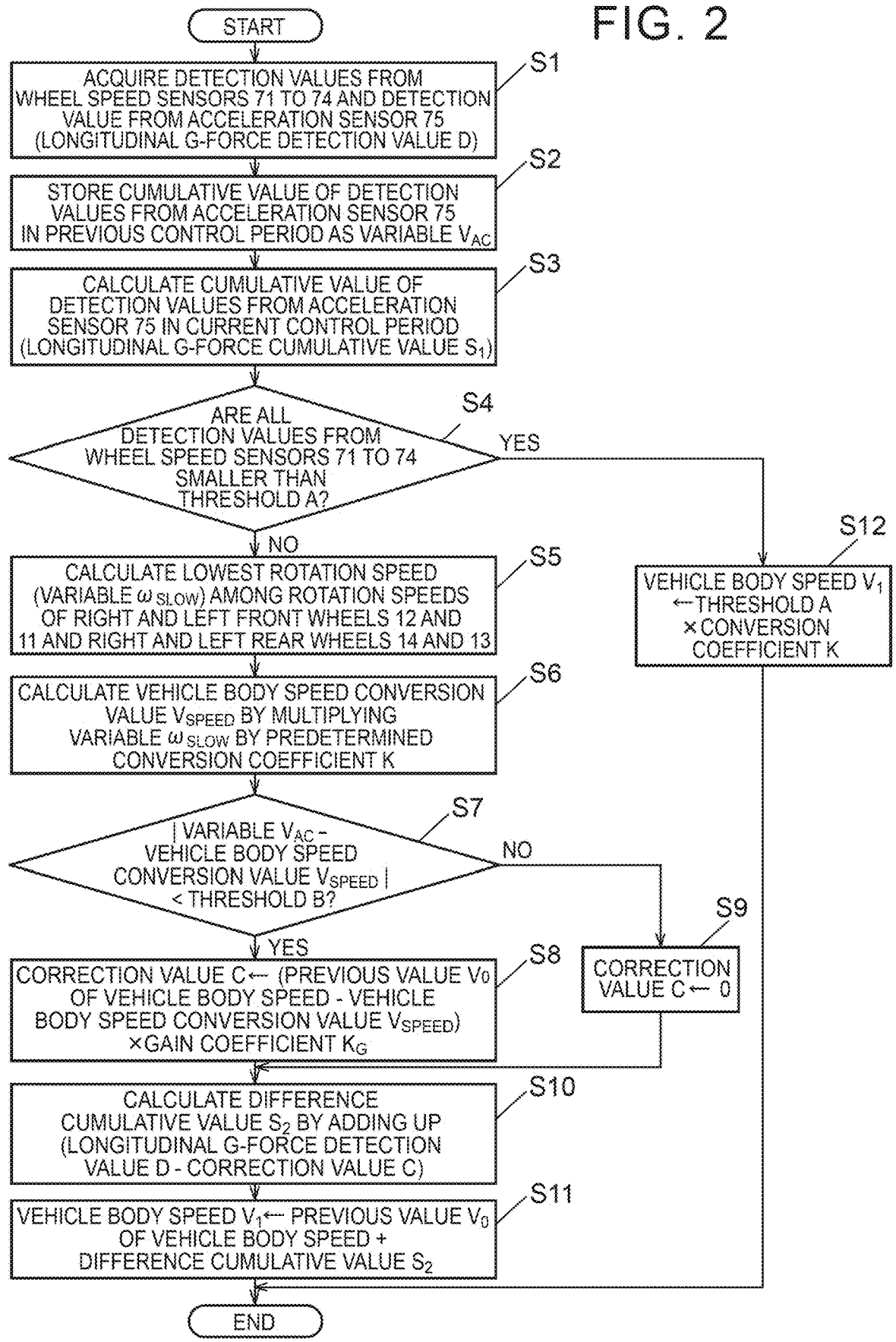
FIG. 2 is a flowchart illustrating a specific example of an arithmetic process to be executed by a controller as a vehicle body speed calculator.

FIG. 2 is a flowchart illustrating a specific example of an arithmetic process to be executed by the controller 61 as the vehicle body speed calculator 611. After the four-wheel drive vehicle 1 is started, that is, after an ignition is turned ON, the controller 61 repeatedly executes the process of this flowchart in every predetermined control period (for example, 5 ms) to calculate vehicle body speeds. When the four-wheel drive vehicle 1 is started, each cumulative value described later is initialized to zero. That is, each cumulative value is a sum obtained after the four-wheel drive vehicle 1 is started and power supply to the control apparatus 6 is started.

In the flowchart illustrated in FIG. 2, the controller 61 first acquires detection values from the wheel speed sensors 71 to 74 and a detection value from the acceleration sensor 75 (Step S1). Next, the controller 61 stores a cumulative value of detection values from the acceleration sensor 75 in a previous control period as a variable $V_{AC}$ (Step S2), and then calculates a cumulative value of detection values from the acceleration sensor 75 in a current control period (Step S3). That is, the detection value acquired from the acceleration sensor 75 in Step S1 is added to the variable $V_{AC}$ to obtain a new cumulative value of detection values from the acceleration sensor 75. The detection value acquired from the acceleration sensor 75 in Step S1 is hereinafter referred to as a longitudinal G-force detection value D. The cumulative value of the detection values from the acceleration sensor 75 that is calculated in Step S3 is hereinafter referred to as a longitudinal G-force cumulative value $S_1$.

Next, the controller 61 determines whether all the detection values from the wheel speed sensors 71 to 74 are smaller than a threshold A (Step S4). The threshold A corresponds to a wheel speed in a case where the four-wheel drive vehicle 1 travels at an extremely low speed of, for example, 1 km/h or lower. That is, the result of the determination in Step S4 is positive (Yes) when all the rotation speeds of the right and left front wheels 12 and 11 and the right and left rear wheels 14 and 13 are lower than the threshold A indicating that the four-wheel drive vehicle 1 is traveling at the extremely low vehicle speed.

When the result of the determination in Step S4 is negative (No), the controller 61 extracts a wheel having a lowest rotation speed from among the right and left front wheels 12 and 11 and the right and left rear wheels 14 and 13, and sets the rotation speed of the extracted wheel as a variable $\omega_{SLOW}$ (Step S5). Next, the controller 61 determines a vehicle body speed conversion value $V_{SPEED}$, which is a conversion of the variable $\omega_{SLOW}$ into a vehicle body speed, by multiplying the variable $\omega_{SLOW}$ by a predetermined conversion coefficient K (Step S6). The controller 61 determines whether an absolute value of a difference between the vehicle body speed conversion value $V_{SPEED}$ and the variable $V_{AC}$ that is the cumulative value of the detection values from the acceleration sensor 75 in the previous control period is smaller than a threshold B (Step S7). The threshold B is such a small value that the result of the determination in Step S7 is positive (Yes) when the variable $V_{AC}$ and the vehicle body speed conversion value $V_{SPEED}$ are substantially equal to each other.

When the result of the determination in Step S7 is positive (Yes), the controller 61 calculates a correction value C by subtracting the vehicle body speed conversion value $V_{SPEED}$ from a vehicle body speed determined in the previous control period (previous value $V_0$ of vehicle body speed) and multiplying a value obtained through the subtraction by again coefficient $K_G$ (Step S8). The gain coefficient $K_G$ is a positive constant smaller than 1. When the result of the determination in Step S7 is negative (No), the correction value C is set to 0 (zero)(Step S9).

Next, the controller 61 calculates a difference cumulative value $S_2$ by adding up a value (difference) obtained by subtracting the correction value C determined in Step S8 or S9 from the longitudinal G-force detection value D acquired in Step S1 (Step S10). That is, the value of (longitudinal G-force detection value D−correction value C) in the current control period is added to a difference cumulative value $S_2$ calculated in Step S10 of the previous control period to obtain a new difference cumulative value $S_2$. Then, the controller 61 adds the difference cumulative value $S_2$ to the previous value $V_0$ of the vehicle body speed that is determined in the previous control period to determine a vehicle body speed $V_1$ that is an estimated value of a vehicle body speed in the current control period (=previous value $V_0$ of vehicle body speed+difference cumulative value $S_2$) (Step S11).

When the result of the determination in Step S4 is positive (Yes), the controller 61 converts the threshold A into a vehicle body speed by multiplying the threshold A by the predetermined conversion coefficient K, and sets the obtained vehicle body speed conversion value as the vehicle body speed $V_1$ that is an estimated value of the vehicle body speed in the current control period (Step S12). The vehicle body speed $V_1$ determined in Step S11 or S12 is used as a previous value $V_0$ of the vehicle body speed in the process of Step S11 of a next control period.

According to the process illustrated in this flowchart, when the absolute value of the difference between the variable $V_{AC}$ and the vehicle body speed conversion value $V_{SPEED}$ is small in the determination of Step S7, that is, when the vehicle body speed conversion value $V_{SPEED}$ is presumed to be an actual vehicle body speed because at least one of the right and left front wheels 12 and 11 and the right and left rear wheels 14 and 13 does not slip, in other words, when the vehicle body speed conversion value $V_{SPEED}$ is reliable, the correction process of Step S10 is performed by using the correction value C calculated in Step S8. Therefore, the deviation component contained in the longitudinal G-force cumulative value $S_1$ does not continue to increase due to, for example, accumulation of detection deviations of the acceleration sensor 75. Further, erroneous correction based on a rotation speed of a slipping wheel is prevented. Thus, the vehicle body speed can be determined with high accuracy.

In Step S7, the difference between the cumulative value of the accelerations in the longitudinal direction of the vehicle in the previous control period (V) and the vehicle body speed conversion value of the lowest rotation speed of the wheel ($V_{SPEED}$) is compared to the predetermined threshold B. For example, when the extracted wheel having the lowest rotation speed slips and the rotation speed of this wheel abruptly increases after the calculation of the vehicle body speed $V_1$ in the previous calculation period, the correction value C can be set to zero (Step S9) to prevent correction. In other words, it is possible to prevent erroneous correction to make the vehicle body speed $V_1$ closer to a vehicle body speed conversion value of the rotation speed of the slipping wheel.

In Steps S8, S10, and S11, the vehicle body speed $V_1$ is calculated as a value obtained by summing the previous value $V_0$ of the vehicle body speed and the cumulative value obtained by applying, to the longitudinal G-force detection value D, the correction value C determined by using the gain coefficient $K_G$ smaller than 1 (longitudinal G-force detection value D−correction value C). Therefore, even if the difference between the longitudinal G-force cumulative value $S_1$ and the vehicle body speed conversion value $V_{SPEED}$ is large, the vehicle body speed $V_1$ can be made gradually closer to the vehicle body speed conversion value $V_{SPEED}$. Thus, an abrupt fluctuation of the vehicle body speed $V_1$ is suppressed.

Figure 3A:
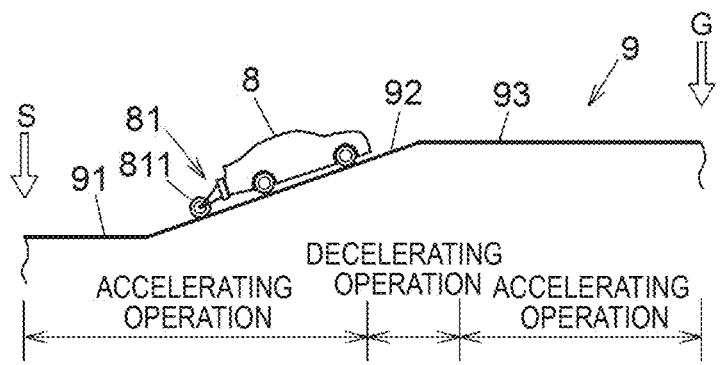
FIG. 3A is a layout diagram illustrating inclination of a test course where a test vehicle travels.
Figure 3B:
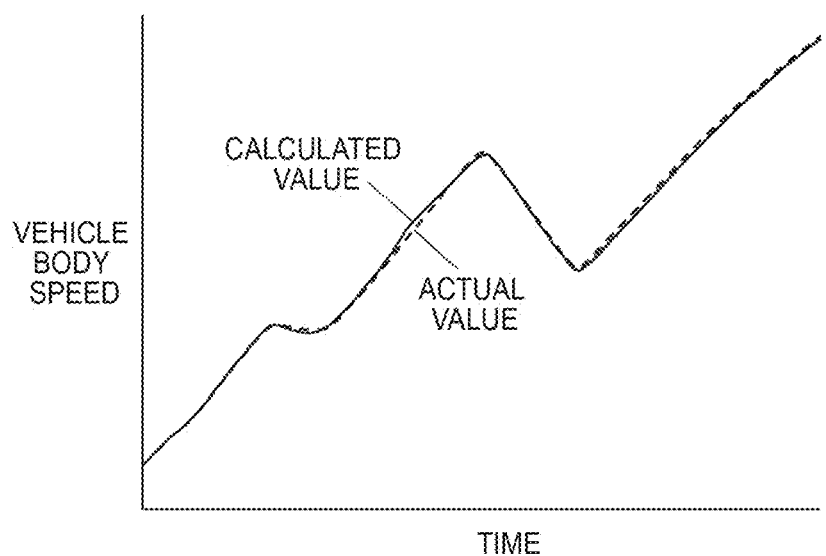
FIG. 3B is a diagram illustrating comparison between a calculation result of a vehicle body speed estimated by a calculation method according to the embodiment and a calculation result of a vehicle body speed according to a comparative example, in which an upper part is a graph illustrating, together with an actual value, the vehicle body speed calculated by the calculation method according to this embodiment, and a lower part is a graph illustrating, together with an actual value, the vehicle body speed calculated by a calculation method according to the comparative example.
Figure 3B:
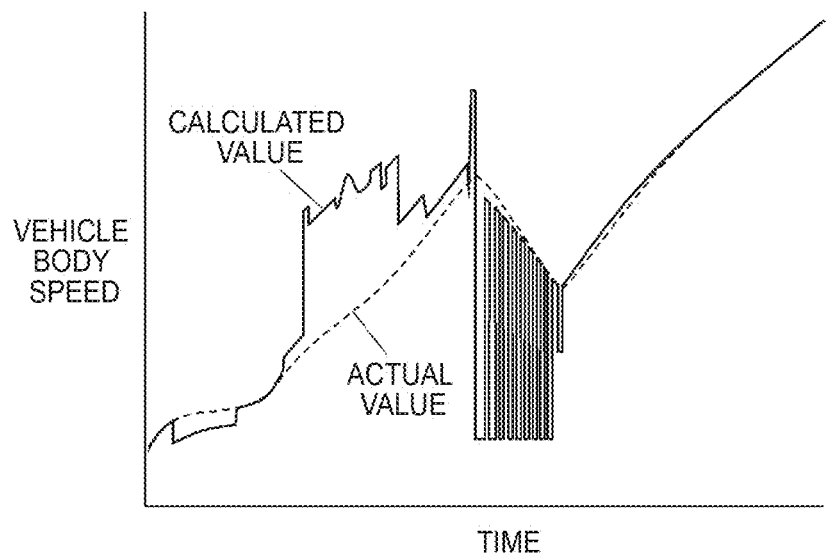

FIG. 3A and FIG. 3B illustrate comparison between a calculation result of a vehicle body speed estimated by the calculation method according to this embodiment and a calculation result of a vehicle body speed according to a comparative example. FIG. 3A is a layout diagram illustrating inclination of a test course 9 where a test vehicle 8 travels. An upper part of FIG. 3B is a graph illustrating the vehicle body speed calculated by the calculation method according to this embodiment. A lower part of FIG. 3B is a graph illustrating the vehicle body speed calculated by a calculation method according to the comparative example.

The test vehicle 8 has a vehicle speed measurement apparatus 81 configured to detect an accurate vehicle body speed based on a rotation speed of a wheel 811 that rotates on a road. The configuration of the test vehicle 8 is the same as the configuration illustrated in FIG. 1.

The test vehicle 8 travels along the test course 9 from a start point S to a goal G. The test course 9 includes a first flat road 91 extending from the start point S, a second flat road 93 extending behind the goal G, and a slope 92 between the first flat road 91 and the second flat road 93. A driver of the test vehicle 8 depresses an accelerator pedal to accelerate the test vehicle 8 from the start to a point before the top of the slope 92, then depresses a brake pedal to apply a brake to the test vehicle 8 while the test vehicle 8 passes through the top of the slope 92, and then depresses the accelerator pedal again to accelerate the test vehicle 8.

The method for calculating a vehicle body speed according to the comparative example is as follows. (1) When rotation speeds of all wheels are smaller than a predetermined threshold indicating a traveling condition at an extremely low speed, the threshold is converted into a vehicle body speed. (2) When absolute values of the amounts of change in the rotation speeds of the wheels per unit time are smaller than a predetermined value and therefore the rotation speeds of the wheels are substantially constant, a lowest rotation speed among the rotation speeds of the four wheels is converted into a vehicle body speed. (3) During braking, a highest rotation speed among the rotation speeds of the four wheels is converted into a vehicle body speed. (4) In a case other than the cases (1) to (3), a cumulative value of detection values of accelerations in the longitudinal direction of the vehicle is compared to the vehicle body speed conversion value of the lowest rotation speed of the wheel. When an absolute value of a difference obtained through the comparison is smaller than a predetermined threshold, the vehicle body speed conversion value is set as a vehicle body speed. When the absolute value of the difference is equal to or larger than the predetermined threshold, the cumulative value of the detection values of the accelerations in the longitudinal direction of the vehicle is set as a vehicle body speed.

When the vehicle body speed is estimated by the calculation method according to this embodiment as illustrated in the upper part of FIG. 3B, the calculation value of the vehicle body speed highly agrees with an actual value of the vehicle body speed that is measured by the vehicle speed measurement apparatus 81. Thus, a highly accurate vehicle body speed is obtained. In the calculation method according to the comparative example, the calculation result of the vehicle body speed varies significantly depending on the cases (1) to (4), and also deviates significantly from the actual value of the vehicle body speed.

According to this embodiment, a highly accurate vehicle body speed can be determined, and the driving force transmission apparatus 5 can appropriately control the driving force to be transmitted to the right and left rear wheels 14 and 13. Thus, the acceleration performance and the traveling stability of the four-wheel drive vehicle 1 can be increased.

Supplementary Note

Although the present disclosure is described above based on the embodiment, the embodiment is not intended to limit the claimed disclosure. It should be noted that all combinations of the features described in the embodiment are not essential for the solution of the disclosure to the problem.

The present disclosure may be modified as appropriate by partially omitting, adding, or replacing components without departing from the spirit of the present disclosure. For example, the embodiment described above is directed to the case where the driving force transmission apparatus 5 is arranged between the propeller shaft 20 and the rear differential 4 and the driving force of the engine 15 arranged on the front wheel side is distributed to the right and left front wheels 12 and 11 and the right and left rear wheels 14 and 13. The configuration of the four-wheel drive vehicle to which the present disclosure is applied is not limited to this configuration. For example, the rear differential 4 may be omitted, and two driving force transmission apparatuses 5 may be arranged in association with the right rear wheel 14 and the left rear wheel 13.

The present disclosure may be applied to a four-wheel drive vehicle having a configuration in which the driving force transmission apparatus 5 is omitted and a center differential is provided to distribute the driving force of the engine 15 to the right and left front wheels 12 and 11 and the right and left rear wheels 14 and 13 at predetermined distribution ratios.

The present disclosure may be applied to a four-wheel drive vehicle having a configuration in which right and left front wheels are driven by an engine and right and left rear wheels are driven by an electric motor. The present disclosure may also be applied to a four-wheel drive vehicle having a configuration in which wheels are driven by in-wheel motors.

What is claimed is:

1. A control apparatus configured to control a four-wheel drive vehicle configured to drive right and left front wheels and right and left rear wheels, the control apparatus comprising an electronic control unit, wherein:
   the electronic control unit is configured to calculate a vehicle body speed based on rotation speeds of the wheels and a cumulative value of accelerations in a longitudinal direction of the vehicle, the accelerations being detected by an acceleration sensor;
   the electronic control unit is configured to calculate the vehicle body speed based on the cumulative value of the accelerations;
   the electronic control unit is configured to calculate a correction value based on a lowest rotation speed among the rotation speeds of the wheels under a predetermined condition; and
   the electronic control unit is configured to perform correction by using the correction value to make the vehicle body speed closer to a vehicle body speed conversion value of the lowest rotation speed.

2. The control apparatus for the four-wheel drive vehicle according to claim 1, wherein the predetermined condition is that a difference between the cumulative value of the accelerations in the longitudinal direction of the vehicle and the vehicle body speed conversion value of the lowest rotation speed is smaller than a predetermined value.

3. The control apparatus for the four-wheel drive vehicle according to claim 2, wherein:
   the electronic control unit is configured to calculate the vehicle body speed in every predetermined control period; and
   the electronic control unit is configured to compare, for determination about the predetermined condition, the predetermined value to a difference between a cumulative value of the accelerations in the longitudinal direction of the vehicle in a previous control period and the vehicle body speed conversion value of the lowest rotation speed.

4. The control apparatus for the four-wheel drive vehicle according to claim 3, wherein the electronic control unit is configured to calculate the correction value based on a difference between a previous value of the vehicle body speed and the vehicle body speed conversion value of the lowest rotation speed.

5. The control apparatus for the four-wheel drive vehicle according to claim 3, wherein the electronic control unit is configured to calculate the vehicle body speed as a value obtained by summing a previous value of the vehicle body speed and a cumulative value obtained by applying the correction value to an acceleration in the longitudinal direction of the vehicle.

6. The control apparatus for the four-wheel drive vehicle according to claim 1, wherein the electronic control unit is configured to set, when all the rotation speeds of the wheels are lower than a predetermined threshold, the vehicle body speed to the vehicle body speed conversion value of the predetermined threshold, the predetermined threshold indicating traveling at a predetermined vehicle speed.

* * * * *